No. 616,232. Patented Dec. 20, 1898.
W. E. HARRINGTON.
RAIL BOND.
(Application filed Apr. 9, 1898.)
(No Model.)
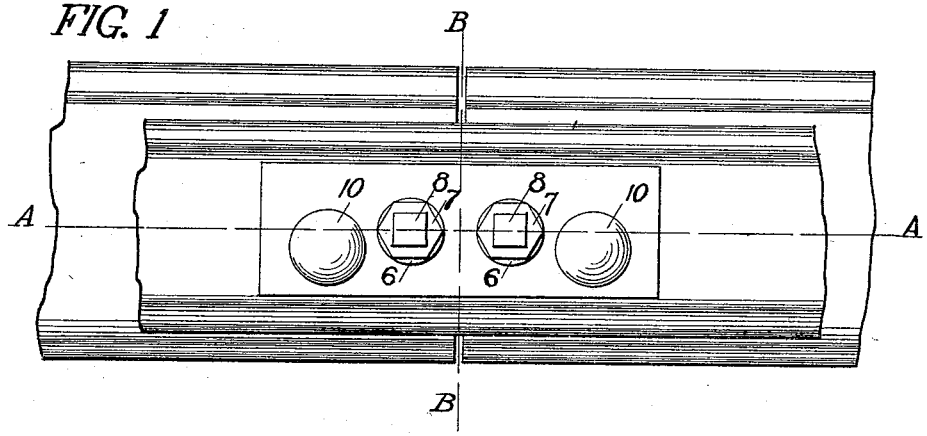
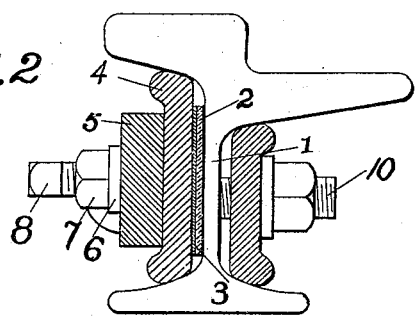
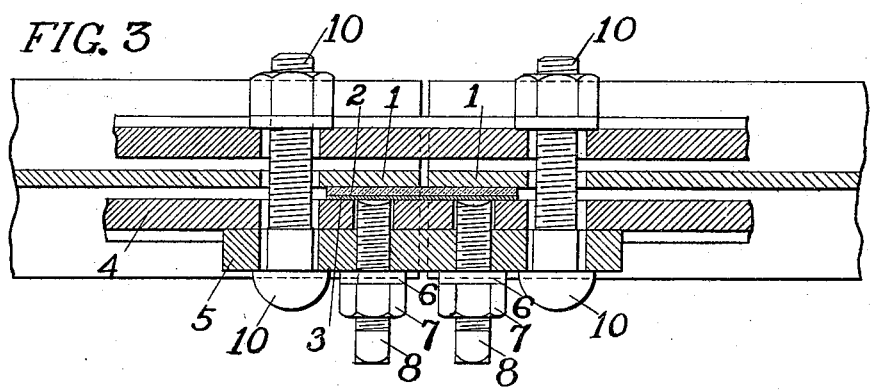
WITNESSES:
Jno. Stokes Adams
E. F. Grace
INVENTOR
Walter E. Harrington
BY Thos. R. Evasdale
ATTORNEY.
THE NORRIS PETERS CO., PHOTO-LITHO., WASHINGTON, D. C.

UNITED STATES PATENT OFFICE.

WALTER E. HARRINGTON, OF CAMDEN, NEW JERSEY.

RAIL-BOND.

SPECIFICATION forming part of Letters Patent No. 616,232, dated December 20, 1898.

Application filed April 9, 1898. Serial No. 676,991. (No model.)

*To all whom it may concern:*

Be it known that I, WALTER E. HARRINGTON, a citizen of the United States, residing at Camden, in the county of Camden, State of New Jersey, have invented a new and useful Rail-Bond, of which the following is a specification.

My invention relates to rail-bonds for electric railways; and among the objects of my invention is to afford improved, durable, and efficient means of electrically connecting the abutting ends of railway-rails. I attain this object by the means illustrated in the accompanying drawings, in which—

Figure 1 is a side elevation of the ends of two rails and binding means. Fig. 2 is an end view of one railway-rail with the fish-plates and binding means in vertical cross-section on the line B B of Fig. 1. Fig. 3 is a longitudinal horizontal section of same on line A A of Fig. 1.

In Figs. 2 and 3 the copper plate 2 is adapted to contact with the web of the rails 1. The portions of said web which are designed to contact with the copper plate are ground or otherwise rendered smooth and clean for the purpose of more perfect contact with said copper plate. Between the copper plate 2 and the fish-plate 4 is interposed the steel plate 3. Upon the outer side of the fish-plate 4 is placed the block 5, secured in place by the bolts 10, which are employed to secure the fish-plates to the rails. Through the block 5 are threaded the set-screws 8, movable freely through the fish-plate 4, and being cup-shaped at their inner ends are adapted to press against the steel plate 3 to force the copper plate 2 into close contact with the rails 1, or the supplemental block 5 may be dispensed with and the set-screws 8 be threaded through the fish-plate 4. The nuts 7 are adapted to lock the screws 8 after adjustment. The spring-washers 6 intermediate the nuts 7 and block 5 are adapted to lock the nuts and prevent their working loose. While the copper plate 2 is pressed firmly against the rails 1, the movement of the ends of the rails upon said plate due to the expansion and contraction of the rails results in the rubbing or friction contact between the rails and the plate, which is a well-known and efficient form of electrical contact—as, for instance, the knife-blade switch.

The contacting side of the copper plate and the ground-surface of the rail may be coated or painted with a flexible solder or any suitable plastic alloy having the quality of electrical conductivity in order to insure the more perfect contact between the copper plate and the rails and also to prevent the corrosion or rusting of said contact-surfaces. As a very thin coat of the flexible solder or plastic alloy is sufficient to insure an efficient electrical contact between the copper plate and the rails and prevent the entrance of the atmosphere or moisture between them, it is not essential that the solder or alloy should remain permanently plastic after being put in place, nor is it necessary to employ more of the solder or alloy than will readily adhere to the surface of the copper plate and rail until they are firmly secured together, thus rendering unnecessary the use of a special receptacle or gasket to retain the alloy. Should the said solder or alloy become hardened or set after the lapse of time, the efficiency of the contact is not impaired, owing to the nature of the contacting surfaces and to the direct pressure between the plates and the railway, which is maintained by the screws 8. It is thus obvious that a much more efficient conducting means is thus provided than has been afforded by the wire bonds that have been heretofore used, whether with or without plastic alloy or solder, for the reason that the surface of contact between the rail and bond is greater. The carrying capacity of the copper plate is greater than that of the wire bond heretofore used. The contact constantly maintained between the bond and the rail is more efficient and can be constantly tested by the track-walker as he tests the nuts of the fish-plate. Said set-screws 8 can always be kept tight, so as to maintain perfect engagement of the bond with the rails.

In place of the solder or plastic alloy or in combination therewith I may have the contacting surfaces of the bond or rail, or both, thinly coated or plated with lead, zinc, tin, or some other metal less likely to rust or corrode than the metal composing the conductors or bond, which, while it interferes but slightly with the electrical contact between the members, serves a most important function in protecting the contacting surfaces from deterioration by cause of rusting or oxidation.

By plating with lead, zinc, or similar metal the threaded portions of the bolts and set-screws I secure the double advantage of affording additional stick or lock of the nut or screw and also of protecting the metal from moisture, which causes the rusting of the same. In many instances the nuts and bolts in common use with railway-rails become so thoroughly rusted together that they can only be separated by breaking, thus involving great waste.

An additional important feature in the rapid extension of electric railways beyond the cities into rural districts is the security of the bond from improper molestation. Large quantities of wire bonds such as are now in use are continually stolen and have to be replaced, thus causing great loss and inconvenience to operators of these roads. The bond shown in my device is concealed and secured beneath the fish-plate.

It is obvious that while the bond shown in the accompanying drawings is only on one side of the rail a similar device may be with equal facility placed upon the other side of the rail, thus doubling the efficiency, if such were needed. It is also obvious that in some cases the set-screws 8 may be dispensed with, and the pressure exerted by the bolts 10 through the fish-plate 4 upon the copper plate 2 may be sufficient to maintain it in efficient electrical contact with the rails.

What I claim as my invention, and desire to secure by Letters Patent, is—

1. In combination with abutting ends of railway-rails, a bonding member with smooth contacting surface adapted to contact therewith and set-screws adapted to act upon said bonding member to maintain pressure between it and the rails, substantially as described.

2. In combination with abutting ends of railway-rails, a bonding member with smooth contacting surface adapted to contact therewith, a temporarily plastic alloy intermediate said bonding member and the rails and set-screws adapted to act upon said bonding member to maintain pressure between it and the rails, substantially as described.

3. In combination with abutting ends of railway-rails, a bonding member adapted to contact therewith, set-screws and a steel plate intermediate the set-screws and bonding member, the set-screws adapted to act upon said steel plate to maintain pressure between the rails and the bonding member, substantially as described.

4. In combination with abutting ends of railway-rails, fish-plates and bolts for securing same, a bonding member adapted to contact with the rails beneath the fish-plate and set-screws operative independently of the bolts adapted to act upon said bonding member to maintain pressure between the rails and bonding member, substantially as described.

5. In combination with abutting ends of railway-rails, fish-plates and bolts for securing same, a bonding member adapted to contact with the rails beneath the fish-plate, set-screws operative independently of the bolts and steel plate intermediate the set-screws and bonding member, the set-screws adapted to act upon the steel plate to maintain pressure between the rails and the bonding member, substantially as described.

6. In combination with abutting ends of railway-rails, fish-plates and bolts for securing same, a bonding member adapted to contact with the rails beneath the fish-plate, a block outside said fish-plate with set-screws threaded therethrough and freely movable through the fish-plate, adapted to maintain pressure between the bonding member and rails, substantially as described.

WALTER E. HARRINGTON.

Witnesses:
G. H. CLAMER,
S. T. CORLISS.